Figure 6:
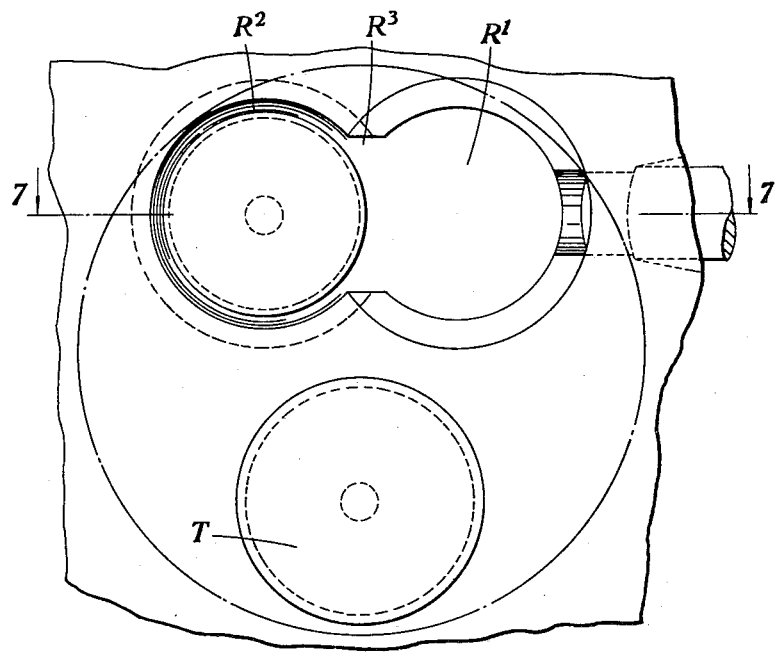

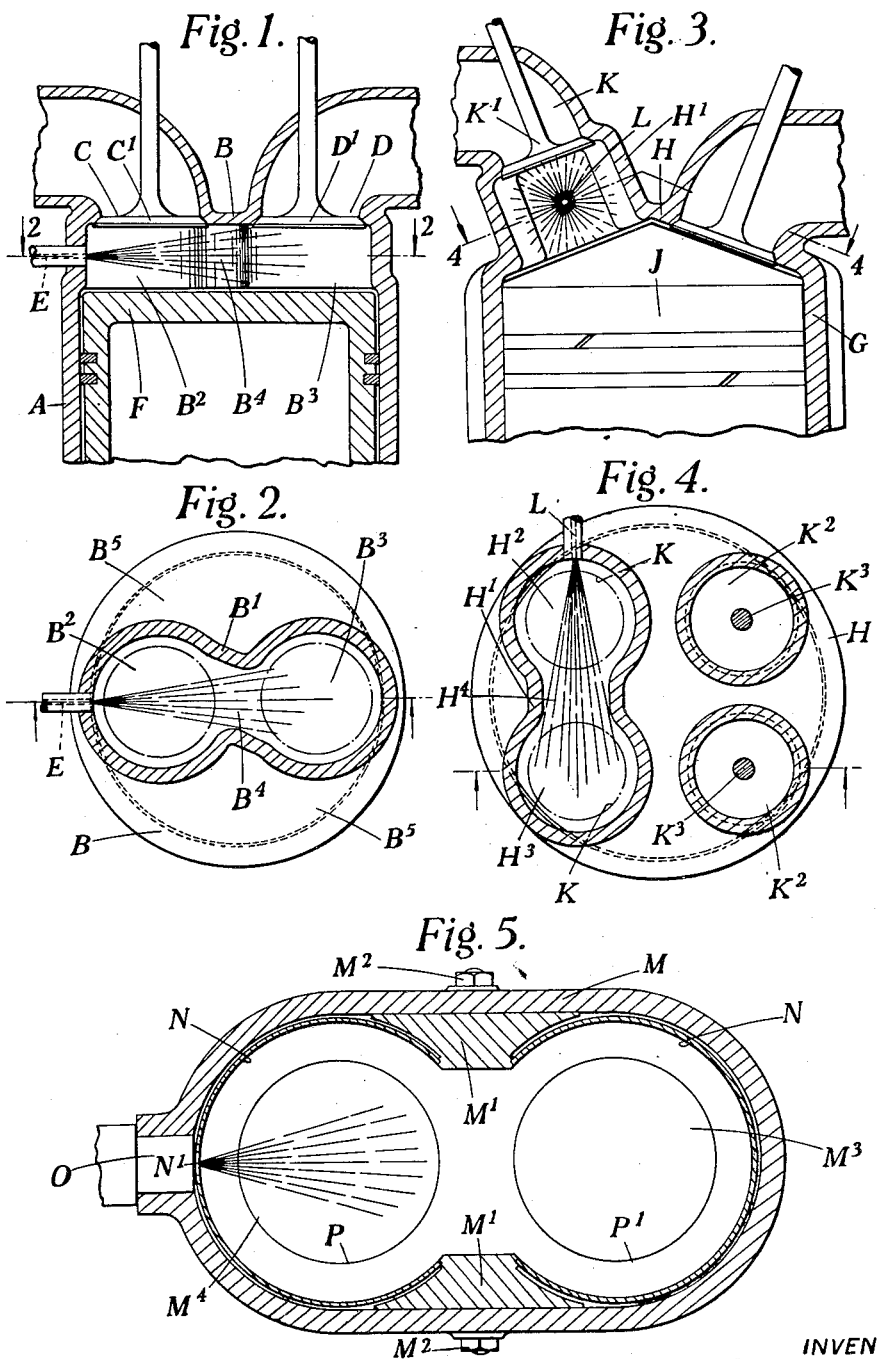

Sept. 19, 1933.        H. R. RICARDO        1,927,374
   COMBUSTION CHAMBER OF INTERNAL COMBUSTION ENGINES OF THE
      LIQUID FUEL INJECTION COMPRESSION IGNITION TYPE
              Filed May 3, 1932        2 Sheets-Sheet 2

INVENTOR
Harry Ralph Ricardo
BY
Watson, Coit, Morse + Grindle
ATTORNEYS

Patented Sept. 19, 1933

1,927,374

UNITED STATES PATENT OFFICE 1,927,374

COMBUSTION CHAMBER OF INTERNAL COMBUSTION ENGINES OF THE LIQUID FUEL INJECTION COMPRESSION IGNITION TYPE

Harry Ralph Ricardo, London, England

Application May 3, 1932, Serial No. 608,962, and in Great Britain June 11, 1931

7 Claims. (Cl. 123—32)

This invention relates to internal combustion engines of the liquid fuel injection compression ignition type and has for its object to provide an improved construction and arrangement of the combustion chambers in such engines particularly but not exclusively applicable to four-stroke poppet valve engines, which while enabling efficient combustion to be obtained will at the same time be convenient mechanically.

To this end according to the present invention the combustion chamber of an internal combustion engine of the liquid fuel injection compression ignition type which is of elongated or trough-like form with the whole or the greater part of one side of the combustion chamber opening into the cylinder bore, has the width of a part thereof at or about the centre of its length reduced so as to be less than the width of the end portions of the combustion chamber which thus constitute lobes connected by the narrower part lying between them, a fuel injection device being situated at or towards one end of the combustion chamber and adapted to deliver fuel towards the narrower part thereof.

Preferably the longitudinal axis of the combustion chamber lies in a plane substantially at right angles to the cylinder axis, and the depth of the combustion chamber is approximately constant throughout its length. In some cases, however, the longitudinal axis of the combustion chamber may lie in a plane which is somewhat inclined to the cylinder axis, while the depth of the combustion chamber may vary at different points in its length.

When the invention is applied to an engine of the four-stroke poppet valve type, one or more of the ports may open into the combustion chamber. Where one port only opens into the combustion chamber this may open through the roof of one of the lobe-like end portions thereof, while where two ports open into the combustion chamber one port conveniently opens through the roof of each lobe-like end portion. For example an inlet and an exhaust port or two exhaust ports may open into the combustion chamber, and where two exhaust ports open into the combustion chamber one or more inlet ports also controlled by poppet valves conveniently open directly into the cylinder.

The form of the fuel injection device employed may vary but preferably this device is adapted to deliver fuel in a hollow cone of spray.

If desired one or both of the end portions of the lateral wall of the combustion chamber may be provided with a liner, preferably metallic, constructed and arranged so as to prevent free flow of heat from the hot gases in the combustion chamber to and through these portions of the walls. Thus in one arrangement in which ports controlled by poppet valves are formed in the end portions of the roof of the combustion chamber, these end portions being formed as part-cylindrical lobes substantially concentric with the ports, the liners will also be of part-cylindrical form and will enable the portions of the combustion chamber wall lying around the valve seats to be adequately cooled without undue loss of efficiency due to loss of heat to this cooled wall.

Figure 7:
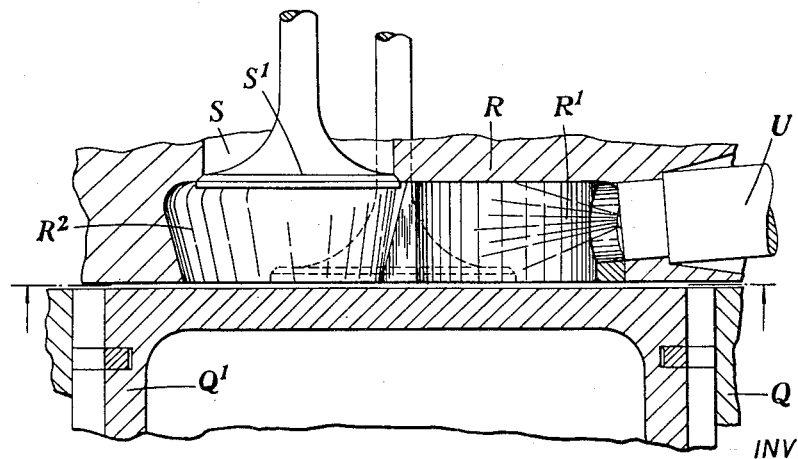

The invention may be carried into practice in various ways but four alternative constructions according to this invention are illustrated somewhat diagrammatically by way of example in the accompanying drawings, in which Figure 1 is a sectional side elevation of one construction according to this invention, Figure 2 is a section on the line 2—2 of Figure 1, Figure 3 is a similar view to Figure 1 of an alternative construction according to this invention, Figure 4 is a section on the line 4—4 of Figure 3, Figure 5 is a similar view to Figure 2 showing a modified construction, Figure 6 is an inverted plan view of a still further form of cylinder head which may be employed in an engine according to this invention, and Figure 7 is a section on the line 7—7 of Figure 6.

In the construction illustrated in Figures 1 and 2 the engine comprises a cylinder A having a cylinder head B which may be formed integral therewith or separately therefrom. In the cylinder head B is formed an elongated trough-like combustion chamber $B^1$, the length of which is substantially equal to the diameter of the cylinder, the longitudinal axis of this chamber passing through the cylinder axis. Viewed in plan the end portions of the combustion chamber are formed, as shown in Figure 2, as part-circular lobes $B^2$, $B^3$ connected by an intermediate portion $B^4$ of restricted width, and inlet and exhaust ports C and D controlled by poppet valves $C^1$ and $D^1$ are formed in the roof of the combustion chamber, each port being substantially concentric with one of the lobes $B^2$ and $B^3$. Disposed in the lobe $B^2$ at one end of the combustion chamber so as to deliver a jet of fuel along the longitudinal centre line of the combustion chamber, is a fuel injection device E preferably so formed as to produce a hollow cone of spray which passes through the lobe B² and the restricted connecting part B⁴ into the lobe B³.

In the above construction the face of the piston F disposed within the cylinder A is conveniently flat and at the end of the compression stroke approaches closely the parts B⁵ of the cylinder head lying on each side of the mouth of the trough-like combustion chamber B¹.

In the alternative construction illustrated in Figures 3 and 4, the cylinder G is provided with a cylinder head H of penthouse form, that is to say is of a form such that the inner face of the cylinder head to which the piston closely approaches comprises two plane surfaces inclined to one another and to the cylinder axis and meeting at a line which extends at right angles to the cylinder axis, lines normal to each of the surfaces meeting the cylinder axis at a point within the cylinder. A piston J within the cylinder has its face correspondingly formed with two plane surfaces which approach closely at the end of the compression stroke the two plane surfaces of the cylinder head. Formed in one semi-circular lateral portion of the cylinder head so as to lie over one side of the cylinder bore is a trough-like combustion chamber H¹ of the same general form as the combustion chamber of the construction shown in Figures 1 and 2, this combustion chamber comprising two lobe-like parts H² H³ connected by a narrower portion H⁴. Formed in the roof of this combustion chamber so as to lie substantially concentric with the lobe-like end portions H² H³ are two exhaust ports K controlled by poppet valves K¹, while two inlet ports K² controlled by poppet valves K³ are provided in the other semi-circular lateral portion of the cylinder head to which the piston closely approaches. In this construction, as shown, the depth of the combustion chamber H¹ is conveniently substantially the same throughout its length, the roof of the combustion chamber lying in a plane which is inclined to planes normal to the axis of the cylinder but substantially parallel to the portion of the face of the piston which approaches closely the part of the cylinder head in which the combustion chamber is formed. A fuel injection device L, preferably adapted to deliver a hollow cone of spray, is disposed in the lobe H² at one end of the combustion chamber H¹ so as to deliver a spray the axis of which lies along the longitudinal centre line of the combustion chamber, this spray passing through the lobe H² and the narrow portion H⁴ into the lobe H³.

In some cases it may be desirable to provide metallic heat-insulating liners for the lobe-like end portions of the combustion chambers of engines according to this invention, and in this case the construction may be as shown in Figure 5. In this construction, which is shown as applied for example to an engine the parts of which are arranged generally as shown in Figures 1 and 2, the wall M of the trough-like combustion chamber, viewed in plan, is of oblong form and metal blocks M¹ are secured, for example by bolts M², to its side walls at points midway between the ends of this chamber and project into the chamber so as to provide a reduction in the effective width of the centre portion of the combustion chamber and thus to provide lobe-like end portions M³ M⁴. Metallic heat-insulating liners are provided in each of the end portions, each of these liners comprising a strip N of metal bent to part-cylindrical form, the ends of the strip engaging shallow shoulders on the blocks M¹ as shown. A fuel injection device O is disposed at one end of the combustion chamber so as to deliver a jet of spray, preferably in the form of a hollow cone, along the longitudinal centre line of this combustion chamber, the adjacent metallic liner N being provided with an aperture N¹ for the passage of this jet therethrough. With a construction as shown in Figure 5, inlet and exhaust ports may be provided in the roof of the combustion chamber and located as indicated at P and P¹ so as to be substantially concentric respectively with the two lobes M⁴ and M³.

In the construction illustrated in Figures 6 and 7, which is particularly applicable to engines for use on road vehicles, the engine comprises a cylinder Q containing a piston Q¹ and provided with a cylinder head R, the piston having a flat face adapted to approach closely the cylinder head at the end of the compression stroke. Formed in one semi-circular lateral portion of the cylinder head so as to lie over one side of the cylinder bore is a trough-like combustion chamber which, viewed in inverted plan as shown in Figure 6, comprises two lobes R¹, R² connected by a narrower portion R³. As shown the lobe R¹ is of slightly larger diameter where it opens into the cylinder bore than the diameter of the part lying adjacent to the roof thereof, while the lobe R² is slightly wider adjacent to its roof than where it opens into the cylinder bore. Formed in the roof of the lobe R² is an exhaust port S controlled by a poppet valve S¹, while an inlet valve T controls an inlet port formed in the flat face of that part of the cylinder head which is not occupied by the combustion chamber.

A liquid fuel injection device U is arranged in the circumferential wall of the lobe R¹ so as to deliver a jet of fuel substantially along the longitudinal centre line of the trough-like combustion chamber considered as a whole.

It is to be understood that the constructions more particularly described above are given by way of example and that the form of the elongated or trough-like combustion chamber with its end portions of greater width than an intermediate portion, the arrangement and type of valves employed, and other details of construction may be modified without departing from this invention.

What I claim as my invention and desire to secure by Letters Patent is:—

1. An internal combustion engine of the liquid fuel injection compression ignition type including in combination a cylinder, a combustion chamber of elongated trough-like form the width of a part of which adjacent to the centre of its length is smaller than the width of the end portions thereof which thus constitute lobes connected by the constricted part lying between them, at least the greater part of one side of the combustion chamber being open to the cylinder bore, and a fuel injection device situated adjacent to one end of the combustion chamber and delivering fuel towards the part thereof of reduced width.

2. An internal combustion engine of the liquid fuel injection compression ignition type including in combination a cylinder, a cylinder head having formed therein a combustion chamber of elongated trough-like form the width of a part of which adjacent to the centre of its length is smaller than the width of the end portions thereof which thus constitute lobes connected by the constricted part lying between them, at least the greater part of one side of the combustion chamber being open to the cylinder bore and exhaust ports being formed respectively one in the roof of each end portion of the combustion chamber while at least one inlet port is formed in a part of the cylinder head not occupied by the combustion chamber, poppet valves controlling the inlet and exhaust ports, and a fuel injection device situated adjacent to one end of the combustion chamber and delivering fuel towards the part thereof of reduced width.

3. An internal combustion engine of the liquid fuel injection compression ignition type including in combination a cylinder, a combustion chamber of elongated trough-like form the width of a part of which adjacent to the centre of its length is smaller than the width of the end portions thereof which thus constitute lobes connected by the constricted part lying between them, at least the greater part of one side of the combustion chamber being open to the cylinder bore, and a fuel injection device situated adjacent to one end of the combustion chamber and delivering fuel in a hollow cone of spray towards the part thereof of reduced width.

4. An internal combustion engine of the liquid fuel injection compression ignition type including in combination a cylinder, a cylinder head having formed therein a combustion chamber of elongated trough-like form the width of a part of which adjacent to the centre of its length is smaller than the width of the end portions thereof which thus constitute lobes connected by the constricted part lying between them, at least the greater part of one side of the combustion chamber being open to the cylinder bore and a port being formed in the roof of one lobe-like end portion, a poppet valve controlling the port, and a fuel injection device situated at or towards the end of the combustion chamber remote from the valve and delivering fuel towards the end containing the valve.

5. An internal combustion engine of the liquid fuel injection compression ignition type including in combination a cylinder, a cylinder head having formed therein a combustion chamber of elongated trough-like form the width of a part of which adjacent to the centre of its length is smaller than the width of the end portions thereof which thus constitute lobes connected by the constricted part lying between them, at least the greater part of one side of the combustion chamber being open to the cylinder bore and a port being formed in the roof of one lobe-like end portion, a poppet valve controlling the port, and a fuel injection device situated at or towards the end of the combustion chamber remote from the valve and delivering fuel towards the end containing the valve, such fuel being delivered in a hollow cone of spray.

6. An internal combustion engine of the liquid fuel injection compression ignition type including in combination a cylinder, a cylinder head having formed therein a combustion chamber of elongated trough-like form, the width of a part of which adjacent to the center of its length is smaller than the width of the end portions thereof which thus constitute lobes connected by the constricted part lying between them, at least the greater part of one side of the combustion chamber being open to the cylinder bore and an exhaust port being formed in the roof of one lobe-like end portion while an inlet port is formed in the part of the cylinder head not occupied by the combustion chamber, poppet valves controlling the inlet and exhaust ports, and a fuel injection device situated at or towards one end of the combustion chamber and delivering fuel towards and through the constricted part thereof.

7. An internal combustion engine of the liquid fuel injection compression ignition type including in combination a cylinder, a cylinder head the inner face of which comprises two plane surfaces inclined to one another and to the cylinder axis and meeting at a line which extends at right angles to the cylinder axis, lines normal to each of the surfaces meeting the cylinder axis at a point within the cylinder, one of the plane surfaces having formed therein a combustion chamber of elongated trough-like form the width of a part of which adjacent to the centre of its length is smaller than the width of the end portions thereof which constitute lobes connected by the constricted part lying between them, at least the greater part of one side of the combustion chamber being open to the cylinder bore and a port being formed in the roof of each of the lobe-like end portions of the combustion chamber while two further ports are formed in the other plane surface of the cylinder head, poppet valves controlling the ports and a fuel injection device situated adjacent to one end of the combustion chamber and delivering fuel towards the part thereof of reduced width.

HARRY RALPH RICARDO.